Figure 1:
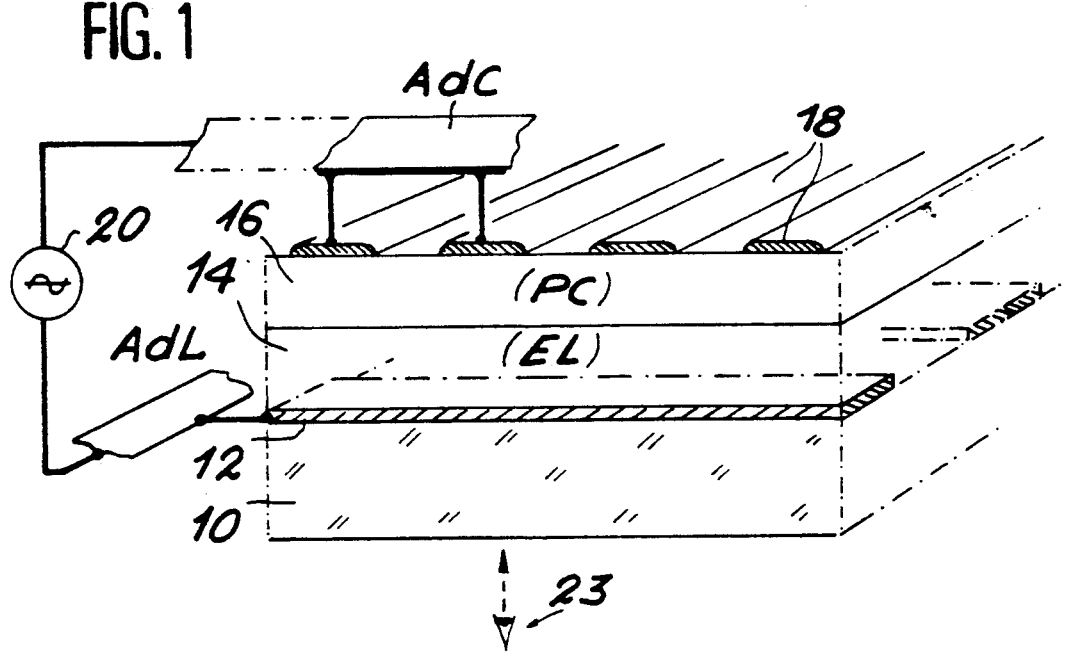

United States Patent [19]
Brunel et al.

[11] Patent Number: 5,146,213

[45] Date of Patent: Sep. 8, 1992

[54] ELECTROLUMINESCENT DISPLAY WITH MEMORY EFFECT AND HALF-TONES

[76] Inventors: Christian Brunel, 17 rue Carle-Hebert, 92400 Courbevoie; Pascal Thioulouse, 19 rue Nélaton, 75015 Paris, both of France

[21] Appl. No.: 569,528

[22] Filed: Aug. 20, 1990

Related U.S. Application Data

[63] Continuation of Ser. No. 195,669, May 17, 1988, abandoned.

[30] Foreign Application Priority Data

May 18, 1987 [FR] France ............... 87 06914

[51] Int. Cl.$^5$ .......................................... G09G 3/30
[52] U.S. Cl. ................................ 340/781; 340/793; 340/825.81; 315/169.3
[58] Field of Search .............. 340/781, 793, 825.81; 315/169.3; 313/498, 505

[56] References Cited

U.S. PATENT DOCUMENTS

| | | | |
|---|---|---|---|
| 3,531,648 | 9/1970 | Kazan | 250/213 |
| 3,629,653 | 12/1971 | Irwin | 340/793 |
| 3,647,958 | 3/1972 | Sobel | 340/793 |
| 3,753,231 | 8/1973 | Hilsum | 340/825.81 |
| 3,906,290 | 9/1975 | Kurahashi et al. | 340/825.81 |
| 4,035,774 | 7/1977 | Chang | 340/825.81 |
| 4,087,792 | 5/1978 | Asars | 340/781 |
| 4,193,095 | 3/1980 | Mizushima | 340/781 |
| 4,443,741 | 4/1984 | Tanaka et al. | 340/781 |
| 4,495,492 | 1/1985 | Anderson et al. | 340/793 |
| 4,531,160 | 7/1985 | Ehn | 340/793 |
| 4,554,539 | 11/1985 | Graves | 340/781 |
| 4,559,535 | 12/1985 | Watkins et al. | 340/781 |
| 4,661,809 | 4/1987 | Anderson et al. | 340/793 |
| 4,712,877 | 12/1987 | Okada et al. | 340/793 |
| 4,791,417 | 12/1988 | Bobak | 340/793 |

FOREIGN PATENT DOCUMENTS

| | | |
|---|---|---|
| 0203005 | 5/1986 | European Pat. Off. |
| 2382065 | 2/1978 | France |
| 2574972 | 3/1987 | France |
| 2580848 | 5/1987 | France |

OTHER PUBLICATIONS

"Monolithic Thin–Film Photoconductor-AC EL Structure with Extrinsic Memory by Optical Coupling", IEEE Transactions on Electron Devices, vol. ED-33, No. 8, Aug. 1986, Pascal Thioulouse and Ionel Solomon, pp. 1149–1153.

"Monolithic Driver Chips for Matrixed Gray-Shaded TFEL Displays", Tom Gielow et al, Hycom, Inc., Irvine, Calif., Richard P. Tuttle, U.S. Army ERADCOM, Fort Monmouth, N.J.; 1981 SID.

4.1: Multicolor TFEL Display and Exerciser, W. A. Barrow, R. T. Tuenge, and M. J. Ziuchkovski, Planar Systems, Inc., Beaverton, Oreg.; 1986 SID.

Le Vide, Les Couches Minces, vol. 41, No. 231, Mar.–Apr. 1986, pp. 259–260, Paris, France; L. Henry et al.; "Premiere approche de la gravure ionique reactive de couches de GaInAs epitaxiees sur InP", *Entirely*.

*Primary Examiner*—Alvin E. Oberley
*Assistant Examiner*—Richard Hjerpe
*Attorney, Agent, or Firm*—Oblon, Spivak, McClelland, Maier & Neustadt

[57] ABSTRACT

Electroluminescent display with memory effect and half-tones. Each row electrode (L) is subdivided into several subelectrodes (L1,L2) and/or each column electrode (C) is subdivided into several subelectrodes (C1,C2). The row subelectrodes receive different holding voltages (Fe1,Fe2). Thus, each eldim (E) is broken down into subeldims (el1,el2,etc.) whereof the luminance is defined by the surface and the holding frequency. Thus, the juxtaposing of these luminances gives half-tones. Application to displays.

1 Claim, 3 Drawing Sheets

ELECTROLUMINESCENT DISPLAY WITH MEMORY EFFECT AND HALF-TONES

This application is a continuation of application Ser. No. 195,669, filed on May 17, 1988, now abandoned.

The present invention relates to an electroluminescent display means with a memory effect. It is used in alphanumeric, graphic or similar displays and in particular when it is a question of displaying half-tones.

An electroluminescent display with memory effect can be obtained by using an electroluminescent layer covered by a photoconductive layer. The principles of such a display are known. French patent application FR-A-2 574 972 and the article by P. Thioulouse et al entitled "Monolithic Thin Film Photoconductor ACEL Structure with Extrinsic Memory by Optical Coupling" published in IEEE Trans. Electron Devices, describes such a display and is diagrammatically illustrated on the attached FIG. 1.

Such a display comprises a transparent substrate 10, transparent row electrodes 12 (the section shown is assumed to be made along one of these rows), an electroluminescent layer 14, a photoconductive layer and column electrodes 18. The display also comprises an a.c. voltage generator 20. Morever, the row electrodes 12 are connected to said generator 20 via a row addressing circuit AdL and the column electrodes 18 are connected to the same generator by a column addressing circuit AdC. Observation takes place through substrate 10, preferably at 23.

This display operates in the following way. A voltage V is applied between the electrodes, which frame a display point, called an eldim. The luminescence does not appear until the voltage reaches a value V1 corresponding to a certain electric field threshold necessary for obtaining the electroluminescence phenomenon. As from this value, the excited point emits light. That part of the light radiation emitted by layer 14 to the rear reaches photoconductor 16 which, changes from insulant to conductor. Almost all the voltage is then applied to the electroluminescent layer 14 and the electric field applied to said layer increases suddenly. The voltage applied can thus be reduced without the electroluminescene ending. The latter will only disappear when the voltage has dropped belwo the threshold value, which corresponds to a voltage V2 below V1.

If the voltage applied to the electrodes is equal to a value V3 between V1 and V2, the display will be maintained. It is generator 20 which supplies said voltage, which is called the holding voltage. It is permanently applied to the electrodes. The function of the addressing circuits AdL and AdC is to supply, for a short time, at the point which it is wished to excite a voltage increase of amplitude equal to V1-V3.

In order to extinguish an illuminated point, it is merely necessary to apply an erase pulse which, for a short time, brings the voltage below V2.

Generator 20 can be a sinusoidal voltage generator. However, square-wave signal or pulse generators are also suitable.

Memory effect electroluminescent displays can also be obtained with the aid of material having an inherent memory effect.

The problem solved by the present invention is the display of half-tones with such screens. This problem has already found certain solutions in the case where the material has no memory effect. Reference will firstly be made to these solutions and to their disadvantages, after which consideration will be given to solutions which can be suitable for memory effect displays.

The luminance of an electroluminescent eldim is dependent on the amplitude of the control voltage and the frequency of said voltage.

Hereinafter the term "luminance" will systematically relate to spatially averaged values on the surface allocated to the eldim (Sa). The latter includes the emissive surface (Se) and the interelectrode spacers. Thus, if $L_P$ is the punctiform luminance of the transducer, the luminance of the eldim (L) will be: $L = L_P \times Se/Sa$.

The luminance of the eldim is consequently also dependent on the emissive surface (Se).

Three methods are known for obtaining half-tones for a memory-free electroluminescent screen. Each of them makes use of one of the three parameters:

1) Action on the Voltage

According to this method action takes place on the voltage applied to the eldim and in this way the luminance of each eldim is controlled. This method suffers from the disadvantages of requiring specific circuits mixing digital and analog technology and of the difficulty in obtaining a good homogeneity of the light on the screen surface. Such a method is described by Gielow et al in "Monolithic Driver Chips for Matrixed Gray-Shaded TFEL Displays" SID 81 Digest, pp. 24–25.

2) Action on the Frequency

This method is based on the fact that the luminance of an electroluminescent material is roughly proportional to the exciting frequency. It is therefore possible to envisage an addressing method in which the exciting frequency of the eldims is dependent on the intensity of the luminance which it is wished to produce. However, the conception and realization of a control method making it possible to switch different frequency signals from one eldim to the other are very complex. In practice, the manner of operating is different, because there is a sequential modulation of the excitation. The screen is controlled at a given frame frequency (F), but each frame of duration $T = 1/F$ is divided into n subframes of duration $T/n$ during which each eldim can be illuminated or extinguished. The integration of the light emitted during a frame thus makes it possible to obtain n grey levels in linear progression.

This method suffers from the disadvantages of increasing the electric consumption, due to the high exciting frequncy (nF), a risk of flicker for the lowest level half-tones corresponding to the lowest repetition frequencies and therefore limitation of the number of realizable half-tones.

Such a method is described by Barrow et al in "Multicolor TFEL Display and Exerciser" SID 86 Digest, pp. 25-28.

3) Action on the Surface of the Eldim

This method consists of spatially breaking down each eldim into several subeldims and separately exciting the latter. In order to constitute these subeldims use is made of row electrodes formed from several subrows (e.g. n) and column electrodes also formed from several subcolumns (e.g. m). Each eldim defined by the overlap of a row and a column is then formed from $n \times x$ subeldims. Such a method is e.g. described in FR-A-2 580 848. The selected illumination of certain subeldims makes it possible, by spatial integration of the luminance, to reconstitute several half-tones.

The disadvantages of this method are an increase in the resolution of the screen as the square root of the number of half-tones, the limitation of the number of realiable half-tones (n×m half-tones linearly distributed for a maxtrix of n×m subeldims) and an increase in the row scan frequency due to the number of rows being increased by a factor of n for the same number of eldims.

A variant of this method also described in the preceding document consists of using several materials with different electro-optical characteristics. Moreover, the subeldims can have different surfaces. It is thus possible to obtain not only linear, but also geometrical or other level progressions.

This variant permits a gain as regards resolution, row scan frequency and number of realizable half-tones. However, it suffers from the disadvantage of the increased complexity of the screen and correlatively the increased complexity of the constructional process (several etching stages).

With regards to memory effect electroluminescent screens, the preceding methods can be adapted in the following way:

1) Action on the Voltage

This method requires on the part of the electroluminescent material a so-called multistability characteristic, which means that the material must have several stable states in the hysteresis cycle. The luminance in the illuminated state is thus dependent on the level of the writing pulse. The disadvantages are the same as for memory-free screens, namely the need of having specific circuits mixing digital and analog technology and stricter tolerances regarding the luminance homogeneity on the screen surface.

2) Action on the Frequency

This method remains applicablle and certain other disadvantages of the memory-free screens still occur, i.e. risk of flicker for the lowest level half-tones corresponding to the lowest repetition frequencies and therefore limitation of the number of realizable half-tones, whilst this method also reduces the row access time by a factor of n, which constitutes a supplementary constraint regarding the switching time of the memory effect transducer.

3) Action on the Surface of the Eldim

This method can also be suitable, but is inherent disadvantages remain.

In the case of photoconductor displays called (PCEL), multistability properties do not exist in the present state of the art. It is not therefore possible to use the first method employing the modulation of the voltage to carry out half-tones. However, the other methods are applicable, but the best possible advantage is not taken of the possibilities offered by such displays.

For inherent memory effect displays, a multistability exists and it is therefore possible to use the first method. However, it is necessary to very finely control the switching voltage, because the voltage variation between the extreme levels is close to 1V. The method of acting on the voltage for producing half-tones is consequently relatively impracticable with such displays. For other half-tone production methods, there are no differences between inherent memory effect displays and photoconductor displays.

The present invention relates to a memory effect electroluminescent display screen combining two of the aforementioned methods, whilst avoiding their disadvantages. The invention firstly adopts the arrangement consisting of breaking down each eldim into subeldims through the use of subelectrodes. The invention then combines this method with that of control by frequency in the sense that the subelectrodes are excited by holding voltages of different frequencies. However, unlike in the conventional method of acting on the frequency, it is not a question of frequency switching (which leads to the disadvantages referred to hereinbefore), but to a permanent application of signals of different frequencies to the different subelectrodes.

Thus, to a certain extent, several nested subscreens are obtained, each subscreen working at a given holding frequency.

The construction of such an improved screen does not make the production process more complicated, because it calls on the known method of producing subelectrodes. The control circuit is modified in the sense that it must have several holding sources of different frequencies with connections appropriate for the subelectrodes. However, as these voltages are not switched by the control circuits, no particular constructional difficulty is encountered.

Thus, according to the invention, the number of half-tones is increased without any significant increase in the complexity of the means.

More specifically, the present invention relates to an electroluminescent display with memory effect and half-tones comprising:

a matrix screen constituted by a first group of row electrodes, intersecting with a second group of column electrodes, an electroluminescent material being placed between the two groups of electrodes, the screen thus having the same number of eldims as there are electrode overlap points;

a screen control circuit incorporating an a.c. voltage holding source permanently applied to the electrodes, a group of row addressing circuits and a group of column addressing circuits, said two groups of addressing circuits being able to superimpose a voltage pulse on the holding voltage over a set of row-column electrodes in order to illuminate the corresponding eldim;

at least one of the groups of electrodes being subdivided into several subelectrodes, each eldim being thus constituted by several subeldims;

the luminance of an eldim consequently results from the sum of the luminances of the subeldims forming it;

said display being characterized in that:

the holding voltage source is formed from the same number of sources operating at different frequencies as there are subelectrodes in one of the groups of electrodes, each of these sources being permanently connected to these different subelectrodes, the luminance of a subeldim thus being dependent both on its surface, which is defined by the dimensions of the subelectrodes which define the subeldim and the holding frequency applied thereto, the dimensions and the frequencies being chosen so that the luminances of the various subeldims of an eldim are all different, the display of a half-tone for an eldim being obtained by an appropriate combination of the luminances of the subeldims forming the same.

The invention is described in greater detail hereinafter relative to non-limitative embodiments and the attached drawings, wherein show:

FIG. 1 already described, a photoconductor electroluminescent display screen.

Figure 2:
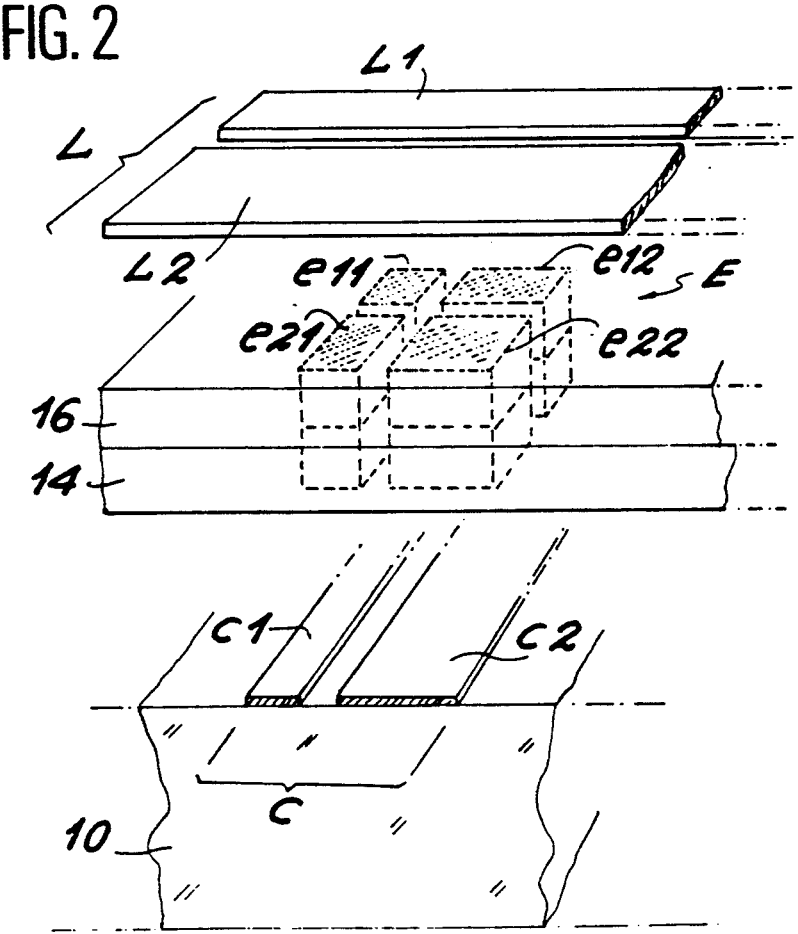

FIG. 2 the breaking down of the electrode rows into subrows, the electrode columns into subcolumns and the eldims into subeldims.

Figure 3:
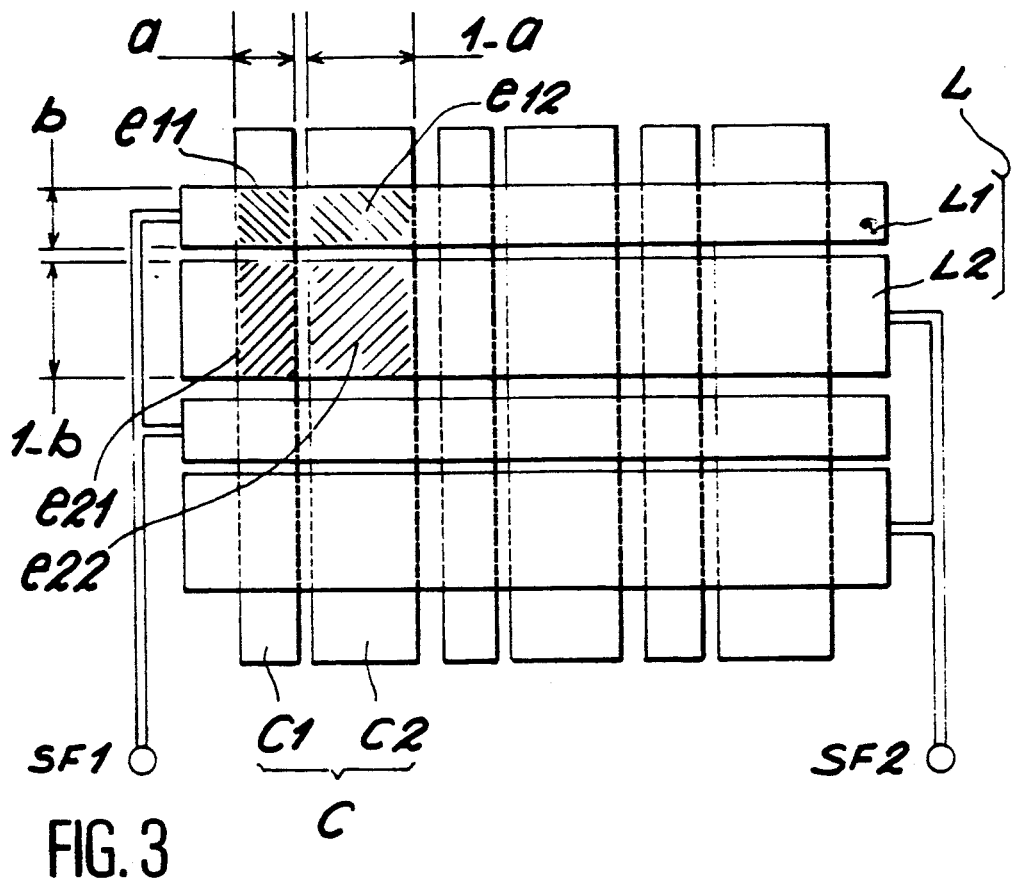

FIG. 3 a diagram showing the distribution of the punctiform luminances of the four subeldims forming an eldim.

Figure 4:
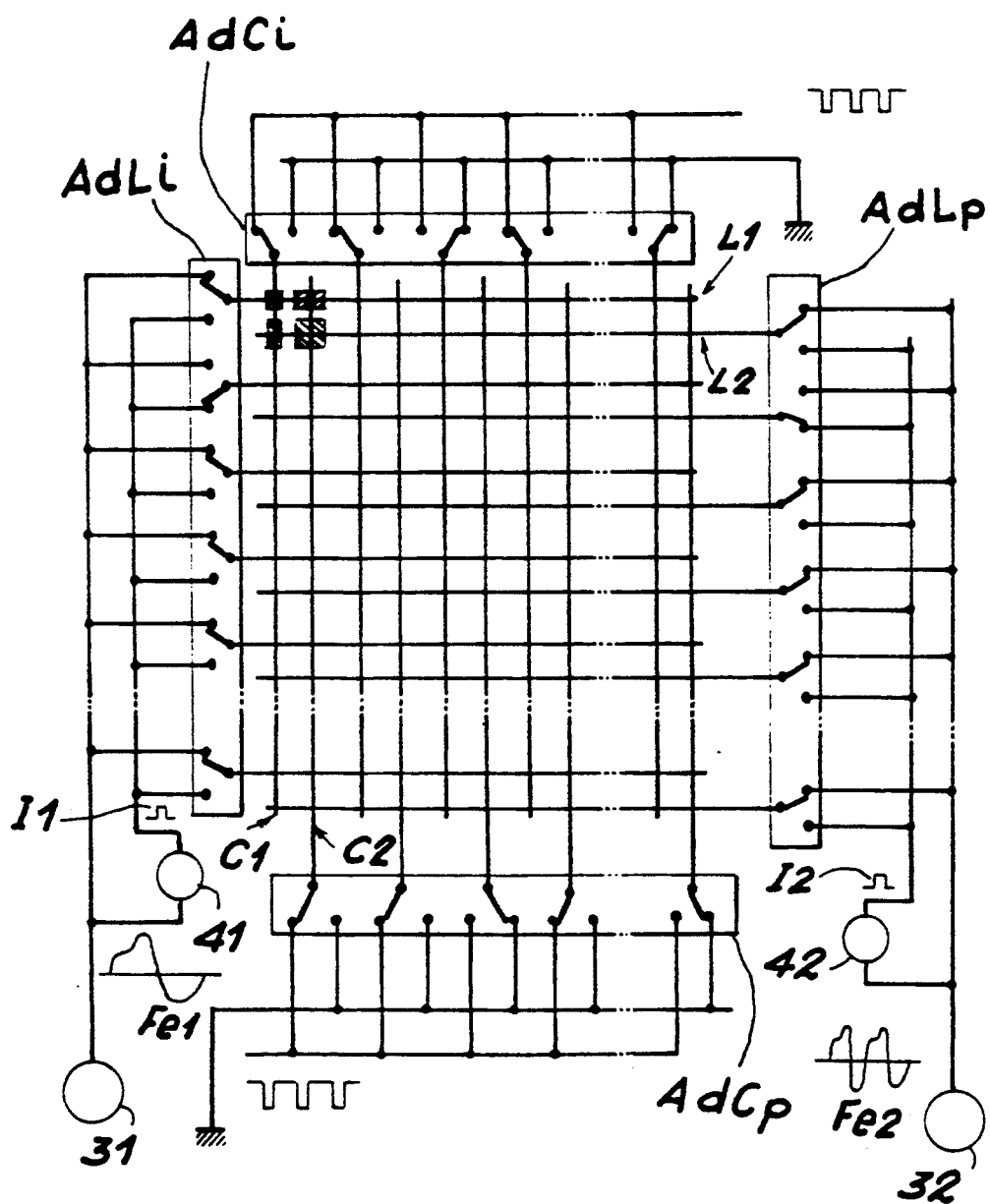

FIG. 4 a screen-control circuit means.

Figure 5:
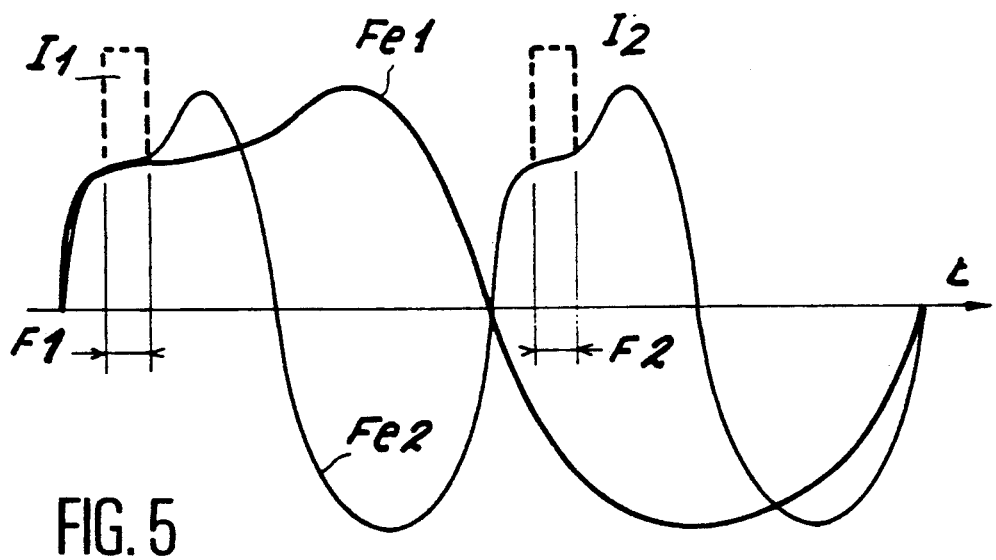

FIG. 5 the control signals of a screen.

The display shown in FIG. 2 comprises row electrodes, whereof only one is shown under reference L and column electrodes, whereof only one is shown under reference C. Electrode L is subdivided into two subelectrodes, the narrow one L1 and the wider one L2. In the same way, electrode C is subdivided into two subelectrodes, the narrower one C1 and the wider one C2. An eldim E, defined by the overlap of L and C is thus formed from four subeldims respectively designated e11, e12, e21 and e22.

As can be better seen from FIG. 3, the subrows of type L1 are all connected to a holding voltage supply or source SF1 of frequency F1 and the subrows of type L2 to a holding voltage supply or source SF2 of frequency F2 higher than F1.

If b and (1−b) are respectively used for designating the respective relative widths of the subrows L1 and L2 and a and (1−a) for the respective relative widths of the subcolumns C1 and C2, the surfaces of the subeldims are respectively:

| | |
|---|---|
| e11:ab | e12:(1-a)b |
| e21:(1-b)a | e22:(1-a)(1-b) |

If the frequencies F2 and F1 are in the ratio c (c=F2/F1), the luminances, which are proportional to the frequencies, will be in the following relations:

| | |
|---|---|
| e11:ab | e12:(1-a)b |
| e21:(1-b)ac | e22:(1-a)(1-b)c |

On taking: $a=b=\frac{1}{3}$ and $c=2$, we obtain $(1-a)=(1-b)=\frac{2}{3}$, which gives the luminances proportional respectively to:

| | |
|---|---|
| e11:1/9 | e12:2/9 |
| e21:4/9 | e22:8/9 |

Thus, the four eldims e11, e12, e21, and e22 have luminances in a geometrical progression of ratio 2. These luminances can be written in the form:

1Lo, 2Lo, 4Lo and 8Lo

It is thus possible to display 16 half-tones by carefully exciting the subeldims in accordance with the following correspondence:

| Half-tones | Excitation of the subeldims |
|---|---|
| -0 | all subeldims extinguished |
| 1Lo | e11 illuminated |
| 2Lo | e12 illuminated |

| Half-tones | Excitation of the subeldims |
|---|---|
| 3Lo | e11 and e12 illuminated |
| 4Lo | e21 illuminated |
| 5Lo | e21 and e11 illuminated |
| etc. | etc. |
| 14Lo | e12, e21, e22 illuminated |
| 15Lo | all subeldims illuminated |

Naturally it is possible to obtain other progressions by choosing other ratios in the surfaces (by acting on a and b) or another ratio for the frequencies.

The invention is not limited to the case of two subrows, two subcolums and two frequencies. It is also possible to use n subrows (with n an integer higher than 2) and an integral column and n frequencies, or n subrows, n frequencies and m columns, etc.

FIG. 4 shows the display according to the invention with its control circuit. It is shown in its variant with two subrows L1, L2 and two subcolumns C1, C2. The subrows L1 are connected to a source 31 of frequency Fe1 and the subrows L2 to a source 32 of frequency Fe2. Moreover, the uneven subrows are connected to a row addressing circuit AdLi and the even subrows are connected to a row addressing circuit AdLp, the uneven subcolumns to an addressing circuit AdCi and the even subcolumns to a column addressing circuit AdCp.

Generators 41 and 42 emit pulses which are superimposed on the holding voltage. Each subrow is connected either directly to the source 31 or 32, or across generator 41 or 42. In FIG. 4 it is assumed that the uneven subrow of the row of rank 2 and the even subrow of said same row of rank 2 are excited, whereas the other subrows only receive the holding voltages.

It can be seen that the sources 31 and 32 are not switched in accordance with the half-tones to be displayed. They are permanently connected to the row electrodes.

With regards to the addressing circuits, they supply pulses which will trigger the electroluminescent effect, as described hereinbefore. FIG. 5 shows a non-limitative example of the shape of the signals which can be used. It is possible to see two holding signals at frequencies Fe1 and Fe2 (in the illustrated variant Fe2=2Fe1) and the pulses I1 and I2, which are superimposed on one or other of the holding voltages.

In order to prevent untimely triggering effects, preference is given to giving each holding voltage a form or shape which is not purely sinusoidal, but which instead has a straight portion. The exciting voltage is applied in a data or time window corresponding to said straight portion. These windows are represented in FIG. 5 by F1 for frequency Fe1 and by F2 for frequency Fe2.

We claim:

1. An electroluminescent display device with a memory effect and half-tone capabilities comprising:
   a first group of row electrodes;
   a second group of column electrodes intersecting said first group of electrodes so as to form a matrix;
   an electroluminescent material placed between the two groups of electrodes such that eldims are formed and such that there are the same number of eldims as there are overlap points of the electrodes;
   a holding voltage supply means which comprises a plurality of holding voltage sources for supplying an a.c. holding voltage to the electrodes;

a plurality of row addressing circuit means and column addressing circuit means each being able to superimpose a voltage pulse on the holding voltage, supplied by said holding supply means, on given set of row-column electrodes so as to illuminate the corresponding eldim at the intersection of said row and column;

a sub-dividing means for subdividing at least one of the group of electrodes into several subelectrodes such that each eldim is subdivided into a plurality of subeldims one of which has at least a different square area than the other subeldims of the same eldim;

wherein the number of said holding voltage sources is equal to the number of subelectrodes in one of the groups wherein each of said holding voltage sources supply a different frequency holding voltages to the subelectrodes;

wherein the luminance of a given subeldim is controlled by both its surface area and the holding frequency applied thereto, such that a half-tone is displayed by a given eldim, by controlling which of the subeldims that are illuminated along the frequency of the holding voltage used to illuminate the given subeldim; and further wherein each row electrode is comprised of a first row subelectrode and a second row subelectrode, said two row subelectrodes have different widths such that the first row subelectrode has half the width of the second row subelectrode with a first one of said holding voltage sources is connected to all of the first row subelectrode and a second of said holding voltage sources is connected to all of the second row subelectrodes; and wherein each column electrode is comprised of a first column subelectrode and a second column subelectrode which are provided such that where said first column subelectrode has half the width of the second column subelectrode and wherein the frequency of the first holding voltage source is half that of the second voltage source and each eldim therefore constitutes four subeldims thereby being capable of producing 16 different half-tones corresponding to 16 possible combinations of four luminances of the four subeldims.

* * * * *